(12) United States Patent
Annerfeldt et al.

(10) Patent No.: US 11,713,684 B2
(45) Date of Patent: Aug. 1, 2023

(54) COOLABLE COMPONENT FOR A STREAMING ENGINE

(71) Applicant: Siemens Energy Global GmbH & Co. KG, Bayern (DE)

(72) Inventors: Mats Annerfeldt, Finspong (SE); Mats Kinell, Finspang (SE); Rickard Magnéli, Norrköping (SE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/416,493

(22) PCT Filed: Dec. 13, 2019

(86) PCT No.: PCT/EP2019/085032
§ 371 (c)(1),
(2) Date: Jun. 20, 2021

(87) PCT Pub. No.: WO2020/136020
PCT Pub. Date: Jul. 2, 2020

(65) Prior Publication Data
US 2022/0049609 A1    Feb. 17, 2022

(30) Foreign Application Priority Data
Dec. 27, 2018 (EP) ...................................... 8248054

(51) Int. Cl.
*F01D 5/18* (2006.01)
(52) U.S. Cl.
CPC .......... *F01D 5/187* (2013.01); *F05D 2230/60* (2013.01); *F05D 2260/20* (2013.01)
(58) Field of Classification Search
CPC ... F01D 5/187; F05D 2230/60; F05D 2260/20
See application file for complete search history.

(56) References Cited

U.S. PATENT DOCUMENTS 6,174,133 B1    1/2001  Bunker
6,261,054 B1    7/2001  Bunker et al.
(Continued)

FOREIGN PATENT DOCUMENTS

CN    1527922 A     9/2004
CN  102644483 A     8/2012
(Continued)

OTHER PUBLICATIONS

PCT International Search Report and Written Opinion of International Searching Authority dated Mar. 17, 2020 corresponding to PCT International Application No. PCT/EP2019/085032 filed Dec. 13, 2019.

*Primary Examiner* — Courtney D Heinle
*Assistant Examiner* — Andrew Thanh Bui
(74) *Attorney, Agent, or Firm* — Wolter Van Dyke Davis, PLLC

(57) ABSTRACT

A coolable component for a streaming engine providing an improved cooling, wherein the coolable component includes an outer wall providing an outer surface adapted to be in contact with a hot fluid like a hot gas stream used in the streaming engine or to be coated with a coating that is adapted to be in contact with the hot fluid, wherein the outer surface is at least partially curved. The coolable component includes at least one cooling channel inside the outer wall adapted to guide a cooling fluid through the cooling channel to cool the outer wall during operation of the streaming engine, wherein the cooling channel is adapted to provide a convection cooling of the outer surface.

17 Claims, 3 Drawing Sheets

(56) References Cited

U.S. PATENT DOCUMENTS

| | | | |
|---|---|---|---|
| 8,414,263 B1 * | 4/2013 | Liang | F01D 5/187 |
| | | | 416/97 R |
| 9,109,451 B1 | 8/2015 | Liang | |
| 2003/0059577 A1 | 3/2003 | Morrison et al. | |
| 2004/0146399 A1 | 7/2004 | Bolms | |
| 2008/0290215 A1 | 11/2008 | Udall et al. | |
| 2012/0111545 A1 * | 5/2012 | Bunker | C23C 4/12 |
| | | | 427/523 |
| 2012/0156054 A1 | 6/2012 | Lacy | |
| 2013/0001837 A1 | 1/2013 | Gohler | |
| 2015/0104322 A1 | 4/2015 | Schick et al. | |
| 2019/0169997 A1 * | 6/2019 | Whitfield | F01D 5/187 |

FOREIGN PATENT DOCUMENTS

| | | |
|---|---|---|
| DE | 102009048665 A1 | 3/2011 |
| EP | 2873806 A1 | 5/2015 |
| WO | 2008046386 A1 | 4/2008 |

\* cited by examiner

COOLABLE COMPONENT FOR A STREAMING ENGINE

CROSS REFERENCE TO RELATED APPLICATIONS

This application is the US National Stage of International Application No. PCT/EP2019/085032 filed 13 Dec. 2019, and claims the benefit thereof. The International Application claims the benefit of European Application No. EP18248054 filed 27 Dec. 2018. All of the applications are incorporated by reference herein in their entirety.

FIELD OF INVENTION

The invention refers to a coolable component used for a streaming engine providing a more specific and beneficial cooling of the outer surface of the coolable component. Additionally, the present invention refers to a streaming engine containing such coolable component. Furthermore, the present invention refers to a method of producing such coolable component. Additionally, the present invention refers to a use of the coolable component for a streaming engine, preferably a gas turbine and a steam turbine.

BACKGROUND OF INVENTION

Coolable components like blades for streaming engines are known to the person skilled in the art. Additionally, methods of producing such coolable components like additive manufacturing are known. Such coolable components can be used, for example, in gas turbines, steam turbines and aircraft turbines.

Turbine blades providing a cooling system manufactured using additive manufacturing are known from DE 10 2009 048 665 A1. Herein, turbine blades providing a 3-dimensional grid are produced, wherein said grid fills the interior of the turbine blade. Said interior is surrounded by an outer wall providing holes connecting the interior with the outside of the tur-bine blade. That way the cooling air from the inside of the turbine blade can additionally provide a film cooling effect on the outside.

US 2008290215 A1 discloses that the interior of a blade produced using additive manufacturing is provided with a stabilizing structure made of stiffeners. Adapting their layout allows to provide a maximized stiffening of the blade using as few materials as possible.

WO 2008/046386 A1 discloses the production of a blade comprising a stiffening structure on its inside as a whole using additive manufacturing. Herein, the outer wall of the blade as well as the interior structures as build up layer by layer using, for example, selective laser melting using a CAD model of the blade.

SUMMARY OF INVENTION

It is an object of the present invention to provide an improved coolable component, especially for gas turbines and aircraft turbines. Furthermore, it is an object of the present invention to provide a method for producing such coolable component. Additionally, it is an object of the present invention to provide a use of the inventive coolable component. These objects and further objects not explicitly stated above are solved by the invention as disclosed herein and also its specific embodiments as disclosed hereafter.

According to an aspect the present invention refers to a coolable component for a turbine device, wherein the coolable component comprises an outer wall providing an outer surface adapted to be in contact with a hot fluid like a hot gas stream used in the streaming engine or to be coated with a coating like a TBC layer that is adapted to be in contact with the hot fluid, wherein the outer surface is at least partially curved, wherein the coolable component comprises at least one cooling channel inside the outer wall adapted to guide a cooling fluid through said at least one cooling channel to cool the outer wall during operation of the streaming engine, wherein the at least one cooling channel is adapted to provide a convection cooling of the outer surface, wherein at least 13% of the outer surface is located above the at least one cooling channel and provides a distance between the outer surface and at least one cooling channel of at least 7% of the total thickness of the outer wall measured along a straight line being perpendicular to the outer surface and being at least 0.2 mm, more preferred at least 0.3 mm, even more preferred at least 0.33 mm, and wherein at least 60% of the outer surface provides a distance to the at least one cooling channel of at most 3 mm, more preferred at most 2.3 mm, even more preferred at most 2 mm. Typically, it is preferred that at least 24%, more preferred at least 29%, even more preferred at least 32%, of the outer surface is located above such cooling channel.

Such coolable component provides a flexible cooling system being able to be adapted for the specific use of the corresponding component. Using a defined system of channels inside the outer wall of the outer wall provides a very reliable system to adapt the cooling of the coolable component to the specific requirements for the specific use, especially in a gas turbine or aircraft turbine, preferably a gas turbine. Herein, the cooling required for the specific use in a defined part of the turbine can be calculated according to planned usage. However, it was noted that realizing such cooling system provides specific challenges. For example, it was noted that long-term usage reliability of such cooling became a major challenge. Surprisingly, said reliability problem was solved by adapting the layout of the cooling channels to provide a certain distance to the outer surface contacting, for example, the hot gas stream inside a gas turbine. Surprisingly, it was noted that the lower limit of the distance from the outer surface can be specified without referring to the specific material used for such coolable component. Although, it should not to be understood to limit the present invention it is the theory that the less resistant materials used for such components require a thicker outer wall while it should simultaneously be kept as thin as possible resulting in a certain ratio being transferable and allowing a person skilled in the art to easily adapt a specific design to fulfill the requirements. A certain absolute minimum thickness, however, also proved to be beneficial. It seems that the high reliability demanded in combination of devastating effects of single weak points result in the significant benefit of such absolute lower limit. Simultaneously, to provide an efficient and reliable cooling it was further required to ensure a defined distribution of the channels within the area of the outer surface. It was noted that the combination of these features synergistically provides a greatly improved cooling without impacting the durability of the coolable component based on, for example, mechanical stress and/or oxidation processes. In fact, the long-term stability seems to also improve based on the highly reliable cooling that can be tailored according to the specific requirements of the corresponding component and its usage.

According to another aspect the present invention refers to a streaming engine, preferably a gas turbine, containing an inventive coolable component.

According to another aspect the present invention refers to a method of producing an inventive coolable component comprising the step of providing an outer wall including the at least cooling channel inside the outer wall.

According to another aspect of the present invention refers to a use of an inventive coolable component in a streaming engine, more preferred a gas turbine. Such systems typically benefit greatly from the inventive coolable component.

According to another aspect of the present invention refers to a use of an inventive coolable component as replacement for different or used coolable components in a streaming engine.

DETAILED DESCRIPTION OF INVENTION

Figure 1:
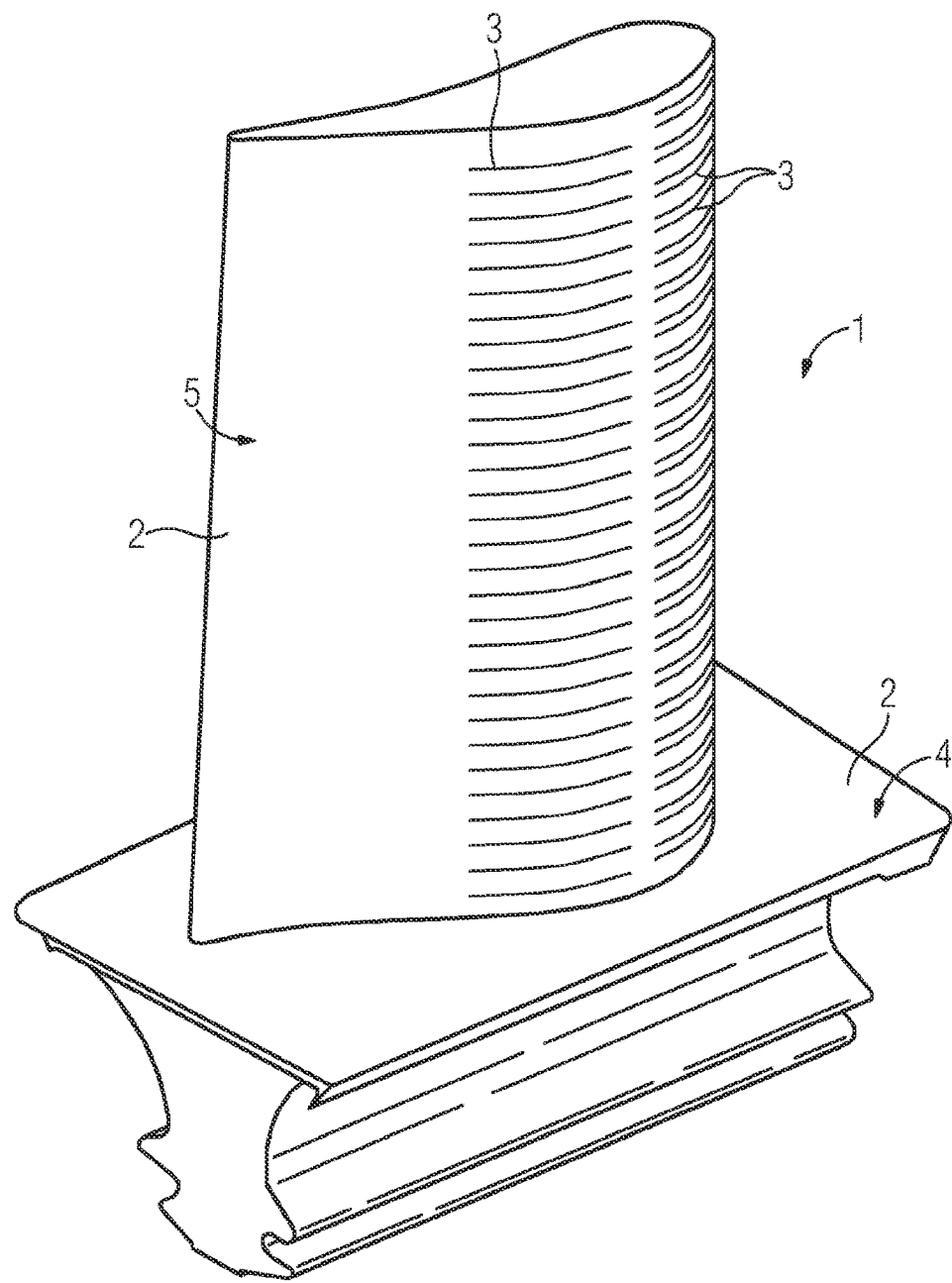
FIG. 1: A semitransparent schematic side view of an inventive coolable component being a turbine blade

According to one aspect the present invention refers to the aforementioned coolable component.

The term "TBC layer" as used herein refers to a Thermal Barrier Coating layer preferably at least essentially consisting of a ceramic material. Such layer increases the resistance against the hot fluid outside the coolable component during usage of a streaming engine and allows using higher temperatures and/or provides higher lifetimes of the coolable component. The inventive coolable components are especially useful to be used with such TBC layer. Surprisingly, it appears that TBC layers placed unto the inventive coolable components provide an especial high life time. It is assumed that the inventive coolable components provide a more homogeneous cooling resulting in decreased thermal stress of the TBC layer.

Herein, such TBC layer can be applied directly onto the outer surface. However, for certain applications it can also be preferred to introduce an intermediate layer between the TBC layer and the outer surface to, for example, increase the bonding of the TBC layer to the outer surface. For typical applications this simple coating structure provides very beneficial results.

The component as referred to herein may particularly relate to a steam turbine or gas turbine component, such as a blade, vane, shroud, heat shield, tip, segment, insert, injector, seal, transition, burner, nozzle, strainer, orifice, liner, distributor, dome, boost, cone, lance, plate, resonator, piston or any corresponding retrofit kit.

The inventive convective cooling can be combined with further types of cooling like film cooling or impingement cooling to further adapt the coolable component to the specific needs of a device containing said coolable component. Herein, the additive manufacturing proved to be especially useful as the cooling of each coolable component can be specifically adapted to the corresponding requirements. Optimizing the cooling of each specific type of coolable component allows using the device at higher temperatures providing, for example, a higher efficiency or a longer usage without downtime of the device containing said component.

Furthermore, it was noted that it was typically preferred to use a higher number of smaller cooling channels to provide the required cooling. In further embodiments of the present invention it is preferred that the at least one cooling channel provides a surface area in a cross section perpendicular to the direction of the at least one cooling channel of at most 120%, more preferred at most 90%, even more preferred at most 70%, even more preferred at most 65%, of $t^2$, wherein t is the average thickness of the outer wall measured perpendicular to the outer surface. Herein, the term "average thickness of the outer wall" refers to the arithmetic mean of the thickness of the outer wall measured along the lines in the cross section perpendicular to the surface and going through the at least one cooling channel.

The phrase "direction of the at least one cooling channel" as used herein refers to the general direction for which the at least one cooling channel is adapted to be flown through by the cooling fluid. In this context, for example, turbulences naturally are not part of such general direction.

Additionally, it was noted that it was typically preferred that the cooling channels provide a minimum thickness. It was especially noted that too thin cooling channels provide an increased risk of blockage. In further embodiments it is preferred that the at least one cooling channel provides a surface area in a cross section perpendicular to the direction of the at least one cooling channel of at least 20%, more preferred at least 30%, even more preferred at least 35%, of $t^2$, wherein t is the average thickness of the outer wall measured perpendicular to the outer surface.

Although, using production processes like additive manufacturing allow to realize very complex structures it was noted that the stream of the cooling fluid is typically beneficially directed through the inside of the outer wall with a pretty regular distance from the outer surface. In further embodiments it is preferred that the at least one cooling channel is adapted to provide a flow of the cooling fluid being essentially parallel to the outer surface. Preferably, the shortest distance between the outer surface and at least 70%, more preferred at least 80%, even more preferred at least 85%, of the at least one cooling channel deviates less than 10%, more preferred less than 8% from the average distance between the outer surface and the cooling channel measured perpendicular to the outer surface.

Furthermore, it was noted that it is typically beneficial that the cooling channel provide at least a certain length. It is assumed that the beneficial results obtained herewith result, for example, from a more regular flow of the cooling fluid compared to short channels ending, for example, very quickly as film cooling holes. In further embodiments it is preferred that each of the at least one cooling channel provides a length of at least 5 times, more preferred at least 7 times, of the average thickness of the outer wall measured perpendicular to the outer surface. Preferably, said aforementioned length of the cooling channel provides a flow of the cooling fluid being essentially parallel to the outer surface.

It was further noted that the inventive cooling channels are beneficially located below a larger percentage of the outer surface. In further embodiments it is preferred that at least 17%, more preferred at least 22%, even more preferred at least 27%, of the outer surface is located above the at least one cooling channel. Herein, the phrase "outer surface being located above at least one cooling channel" as used herein has the meaning that the corresponding outer surface and interior of the at least one cooling channel can be connected by a straight line being perpendicular to the corresponding outer surface.

To provide the required protection from breakage it is typically beneficial to provide a general minimum distance between the at least one cooling channel and the outer surface at least over a great percentage of the outer surface. In further embodiments it is especially preferred that at least 19%, more preferred at least 17%, even more preferred at least 22%, most preferred at most 27%, of the outer surface is located above the at least one cooling channel and provides a distance between the outer surface and at least one cooling channel of at least 10%, more preferred at least 12%, even more preferred at least 14%, of the total thickness of the outer wall measured along a straight line being perpendicular to the outer surface. Additionally, it is typically preferred that the aforementioned distance is at least 0.3 mm, more preferred at least 0.33 mm, even more preferred at least 0.35 mm.

To further decrease the risk of the outer surface breaking open it is typically preferred that at most 5%, more preferred at most 2%, even more preferred 1%, of the outer surface located above the at least one cooling channel provides a distance between the outer surface and at least one cooling channel of at most 3% of the total thickness of the outer wall measured along a straight line being perpendicular to the outer surface. Typically, it is preferred that the aforementioned percentage of the outer surface refers to the at least one cooling channel, wherein the aforementioned distance is at most 5%, even more preferred at most 7%.

Furthermore, it was noted that it is typically beneficial to keep the cooling convection flow of the cooling liquid within a certain distance from the outer surface to be cooled. In further embodiments at least 13%, more preferred at least 17%, even more preferred at least 22%, most preferred at least 27%, of the outer surface is located above the at least one cooling channel and provides a distance between the outer surface and at least one cooling channel of at most 3 mm and at most 35%, more preferred at most 29%, even more preferred at most 25%, of the total thickness of the outer wall measured along a straight line being perpendicular to the outer surface. Typically, it is preferred that the aforementioned fixed upper limit is at most 2.3 mm, more preferred at most 1.9 mm, even more preferred at most 1.6 mm.

Examples of coolable components that might be beneficially modified as stated above are selected from turbine blades like guide vanes or rotor blades, or heat shields as used in, for example, the turbine blade area or combustion chamber for a streaming engine. Such turbine blades can be used, for example, in the turbine part or the compressor part of a streaming engine. Such heat shields can be used, for example, in the compressor part or the turbine part or the burning chamber of for streaming engine The inventive cooling system proved to be especially useful for coolable components providing a curvature of a larger part of the outer surface. Preferably at least 50%, more preferred at least 70%, even more preferred at least 80%, of the outer surface is curved. The inventive system provides a very defined and calculable flow of the cooling fluid along such curved outer surface allowing an improved cooling and higher reliability of the coolable component.

Furthermore, it was noted that the specified upper limit of the distance of the majority of the outer surface to the at least one cooling channel was beneficially further decreased for many applications. In further embodiments it is, thus, preferred that at least 60% of the outer surface provides a distance to the at least one cooling channel of at most 1.8 mm, more preferred at most 1.55 mm, even more preferred at most 1.35 mm. For coolable components like blades it is often preferred that the aforementioned distance is at most 1.05 mm, more preferred at most 0.9 mm. Especially, it is typically preferred for coolable components providing a high thermal strain during use that the aforementioned requirement regarding the distance is fulfilled for at least 70%, more preferred at least 85%, even more preferred at least 95%, of the outer surface.

Additionally, it was noted that the cooling channels can be beneficially adapted to provide a non-homogeneous cooling of the outer surface. In further embodiments it is preferred that the cooling channels are adapted, for example using a changing pitch, a changing form in a cross section perpendicular to the direction of the flow of the cooling liquid, different lengths of the cooling channels, or combinations thereof, to provide a non-homogeneous cooling of the outer surface of the coolable component. For example, providing a changing pitch between the cooling channels provided a very easy and reliable way to provide such non-homogeneous cooling, which might also be further combined with other designs like those mentioned before. Preferably, the coolable component provides at least 3, more preferred at least 5, even more preferred at least 7, cooling channels providing a changing pitch. Including such cooling structure based on the planned cooling effect allows, for example, to introduce the cooling liquid at one point with a single defined pressure and temperature and still achieve a non-homogeneous cooling of the outer surface adapted to the required cooling based on the planned used of the coolable component. It was noted that the required effort when planning the specific cooling is easily balanced out by, for example, the simplified provision of cooling medium during usage.

The cooling channels of the inventive coolable components can provide different shapes in a cross section perpendicular to the direction of the cooling channel. For example, they can be essentially circular, semi-circular, rectangular, triangular, oval, rhomboidal, irregular or combinations thereof in different cross sections along the direction of the cooling channel.

The entry side of the cooling channels preferably provides a protection structure adapted to retain contaminations like micro particles. For example, such protection structure can be a sieve covering the entry side of the cooling channel to prevent such contaminations to enter the cooling channel resulting in a possible blockage of the cooling channel.

Typically, it is further preferred that the coolable component provides a shell-like structure providing the outer wall and an interior chamber limited by the outer wall. Using such shell-like structure decreases the weight of the coolable component being beneficial for certain applications. Herein, it is typically preferred that the interior chamber provides at least one supporting structure to increase the stability of the coolable component. For example, such supporting structure can be one or more support rod extending from the inside of the outer wall through the interior chamber to another part of the inside of the outer wall inside a turbine blade providing an interior chamber surrounded by an outer wall. Furthermore, the supporting structure can be a grid structure filling the interior chamber extending from the outer wall.

Typically, it was preferred that the coolable component provides a certain lower size limit to be able to introduce a more complex and efficient cooling structure. In further embodiments it is preferred that the coolable component has a depth of at least 7 cm, a width of at least 11 cm and a height of at least 13 cm, more preferred a depth of at least 10 cm, a width of at least 15 cm and a height of at least 20 cm.

Furthermore, it was noted that it is beneficial for many applications that the same cooling air is first used for convective cooling inside the cooling channels before it is at least partly, preferably completely, used for film cooling. Although, such layout requires a more detailed planning of the layout it typically greatly simplifies the cool air feed of coolable components providing both types of cooling, as it only requires a single inlet. In further embodiments of the present invention it is thus preferred that the coolable component is adapted to provide a flow of the cooling liquid first through the cooling channels to provide a convective cooling and second through film holes to provide a film cooling.

However, it can also be preferred to separate the film cooling from the interior convective cooling to provide a cooling that can be controlled according to the specific needs. In further embodiments of the present invention it is, thus, preferred that at least a part of the film holes, like at least 50%, even more preferred at least 70%, are not connected to the inventive cooling channels.

According to another aspect the present invention refers to a method of manufacturing an inventive coolable component comprising the step of providing an outer wall including at least cooling channel inside the outer wall.

It is especially beneficial using a flexible method of manufacturing providing the possibility to realize very complex shapes of the outside but also inside the coolable component. According to further embodiments of the present invention it is, thus, preferred that the method of manufacturing the inventive coolable component contains additive manufacturing. It was noted that especially 3D-printing methods are very beneficial to realize the present invention. Typically, it is especially preferred that the complete coolable component is produced using additive manufacturing. Herein, later processing steps like the application of a thermal barrier coating are naturally not included. Examples of such methods of additive manufacturing include selective laser melting (SLM), selective laser sintering (SLS), electron beam melting (EBM) and binder jetting. Naturally, other methods of additive manufacturing or specific variants of the methods mentioned before can be employed.

Herein, using a laser-based method of additive manufacturing typically provided especially useful results as such methods are well established and allow to process materials with a high temperature resistance like nickel superalloys. It was noted that the benefit obtained for a high temperature resistant alloy like especially nickel superalloys by utilizing the present invention is surprisingly big. It is assumed that this results from the high reliability and resistance of such material. This allows to utilize such improved design and especially the preferred embodiments despite typical deviations observed when transferring such design into industrial manufacturing processes. This again allows to optimally tailor the specifics to a specific application based on the invention as disclosed herein to provide a very significant benefit. Especially nickel superalloys are very well suited to realize the inventive designs resulting in easily optimized coolable components reliably providing the described benefits.

Furthermore, it was noted that the advanced cooling design can typically be further improved by including specific flow directions of the cooling fluid. In further embodiments it is, thus, preferred that the at least one cooling channel is adapted to provide a counter wise flow of the cooling fluid through neighboring parts of the at least one cooling channel during operation of the streaming engine.

Furthermore, it was noted that such counter wise flow can be beneficially used to normalize the temperature gradient of the cooling fluid to provide a more homogeneous cooling of the outer surface. According to further embodiments it is, thus, preferred that the at least one cooling channel provides multiple layers providing differing distances to the outer surface, wherein at least a part of the neighboring parts of the at least one cooling channel providing the counter wise flow of the cooling fluid are located in different layers. For example, it can be one cooling channel going in a deeper layer first in one direction and then changing the direction above to cool the outer surface. Thus, the cooling fluid that already lost part of its cooling is further cooled down by the counter wise flow below normalizing the cooling effect.

However, it is also beneficial to provide such counter wise flow of the cooling fluid between neighboring parts of the at least one cooling channel being located in the outer surface. In further embodiments it is preferred that the neighboring parts of the at least one cooling channel are at least in part located near the outer surface. Typically, it is preferred that at least 60%, more preferred at least 75%, even more preferred at least 85%, of the neighboring part of the at least one cooling channel providing the counter wise flow of the cooling fluid are located near the outer surface. The term "cooling channel near the outer surface" as used herein has the meaning that no cooling channel is located between such cooling channel and the outer surface.

According to further embodiments it is preferred that the at least one cooling channel provides multiple layers providing differing distances to the outer surface, wherein at least a part of the neighboring parts of the at least one cooling channel providing the counter wise flow of the cooling fluid are located in different layers and that the neighboring parts of the at least one cooling channel are at least in part located near the outer surface. Including such mixed structure allows a very simple design to provide a very homogeneous cooling of a defined area. Surprisingly it was noted that providing such more homogeneous cooling greatly reduces the stress on the component especially during the startup and especially stressful phases of the usage.

For certain components and applications, it was noted that it is beneficial to provide a very homogeneous cooling of the outer surface based on the inventive counter wise flow for the majority of the outer surface. For example, it is in many cases beneficial to provide such cooling for heat shields at least in certain locations of the streaming engine. In further embodiments it is preferred that at least 90%, more preferred at least 92%, even more preferred at least 95%, of the outer surface being located above the neighboring parts of the at least one cooling channel being adapted to provide a counter wise flow of the cooling fluid, provide a distance of the outer surface to the at least one cooling channel being at most 2.7 mm, more preferred at most 2.5 mm, even more preferred at most 2.2 mm, measured perpendicular to the outer surface.

For typical applications it is beneficial to provide a pitch as well as the distance from the outer surface being selected from certain ranges to provide optimized results for highly stressed applications like for example components like blades utilized in a streaming engine. In further embodiments it is preferred that at least 85% of the neighboring parts of the at least one cooling channel being adapted to provide a counter wise flow of the cooling fluid and being near of outer surface, based on the length of the neighboring parts of the at least one cooling channel, provides a pitch being selected from the range from 1.0 mm to 5.0 mm, more preferred from 1.4 mm to 3.4 mm, even more preferred from 1.5 mm to 3.0 mm and a distance between the at least one cooling channel and the outer surface being selected from the range from 0.35 mm to 2.3 mm, more preferred from 0.45 mm to 1.9 mm, even more preferred from 0.5 mm and 1.5 mm. Typically, it is preferred that that the aforementioned ranges apply to at least 90%, more preferred 93%, even more preferred 95%, of the neigh-boring parts of the at least one cooling channel being adapted to provide a counter wise flow of the cooling fluid and being near the outer surface.

According to another aspect the present invention refers to a streaming engine containing an inventive coolable component. Preferred streaming engines that can contain the inventive coolable component are gas turbines. Herein, it is especially preferred that said device contains at least one heat shield as used in the combustion chamber or turbine section and/or at least one blade like a guide vane or rotor blade being an inventive coolable component. Typically, it is especially preferred that at least 80% of the rotor blades or guide vanes of at least one blade stage of a streaming engine are inventive coolable components. Typically, it is especially preferred that at least 30%, more preferred at least 50%, of the rotor blades and/or guide vanes are inventive coolable components.

According to another aspect the present invention refers to a method of upgrading or servicing a streaming engine containing the step of introducing at least one inventive coolable component into the streaming engine, preferably wherein a different or used coolable component is replaced by the at least one inventive coolable component. Such different coolable component typically differs by means of its cooling method from the inventive coolable component. For example, only a combination of impingement cooling and film cooling or a simpler kind of convection cooling might be used. This might also result in a different outer surface, although, it is typically preferred that the outer surface of the inventive coolable component and the replaced different component are essentially the same. Such way an upgrade of an existing system can be achieved without influencing, for example, the stream of a hot fluid like a hot gas through a gas turbine. The inventive coolable components can, naturally, also be used to replace used coolable components during service or general overhaul. The inventive coolable components show very reliable results and are beneficially used in an operating scheme providing planned service intervals based on estimated lifetimes to provide a maximized operating time without the risk of components breaking down during the usage. The present invention also refers to a method of replacing a coolable component like a used coolable component in a streaming engine, wherein the coolable component is upgraded or serviced by replacing it with the inventive coolable component.

The inventive coolable components can also be a refurbished component. For example, the inventive coolable components can be a used component being inspected, optionally decoated, repaired, optionally coated again and introduced into the same or another streaming engine. Despite the great number of cavities inside the outer wall of the inventive coolable component the specific design allows to decrease or even avoid major damages resulting in irreparable components being required to be replaced by new parts. Thus, the apparently far more fragile structure still provides the required stability and durability to enable a long-term usage of the component requiring only typical refurbishing steps to allow a further use.

According to another aspect of the present invention refers to a use of an inventive coolable component in a streaming engine, more preferred a gas turbine.

According to another aspect the present invention refers to a use of an inventive coolable component as replacement for different or used coolable components in a streaming engine. It was noted that the benefits of the improved cooling in combination with the high reliability of the inventive coolable components resulted in them being especially suited for such purpose.

Further details are described hereafter for illustrating the present invention. Herein, the specific embodiments disclosed only represent preferred embodiments which do not limit the scope of protection only specified by the claims as attached hereto.

FIG. 1 shows a semitransparent schematic side view of an inventive coolable component 1 being a turbine blade more specifically a rotor blade providing an at least partially curved outer surface. The blade part 5 is attached to a blade root 4 both providing outer surface 2 being adapted to directly or indirectly contact the hot fluid used within the streaming engine.

Herein, a part of the at least one cooling channel 3 is visible through the outer surface 2 and the coating applied on the outer surface 2. Said outer surface 2 limits the outer wall of the coolable component. Said coating is adapted to be in contact with the hot fluid being a hot gas stream used in the streaming engine.

Said cooling channels are adapted to guide a cooling fluid within the outer wall near the outer surface 2 to provide convection cooling. At least 13% of the outer surface 2 are located above the at least one cooling channel 3 and provide a distance between the outer surface 2 and the at least one cooling channel 3 of at least 7% of the total thickness 8 of the outer wall measured along a straight line being perpendicular to the outer surface 2 and being at least 0.2 mm. Furthermore, at least 60% of the outer surface 2 provides a distance to the at least one cooling channel 3 being at most 3 mm.

The at least one cooling channel 3 provides a surface area in a cross section perpendicular to the direction of the at least one cooling channel 3 of at most 120% of $t^2$, wherein t is the average thickness of the outer wall measured perpendicular to the outer surface. Herein, the at least one cooling channel 3 is oriented essentially parallel to the outer surface 2 providing a flow of the cooling fluid being essentially parallel to the outer surface. Furthermore, in the inventive example as shown in FIG. 1 at most 5% of the outer surface 2 located above the at least one cooling channel 3 provide a distance between the outer surface 2 and the at least one cooling channel 3 of at most 3% of the total thickness of the outer wall measured along a straight line being perpendicular to the outer surface 2.

The turbine blade as shown in FIG. 1 was manufactured using 3D printing. Herein, the outer wall 6 containing the cooling channels was built upon a base structure, wherein said base structure was produced using a conventional casting process.

After the manufacturing and analyzing the turbine blade as shown in FIG. 1 is adapted to replace an existing turbine blade used in the streaming engine providing an upgrade of the existing system. The improved cooling provides the possibility to increase the temperature used inside the streaming engine to further increase the efficiency.

Figure 2:
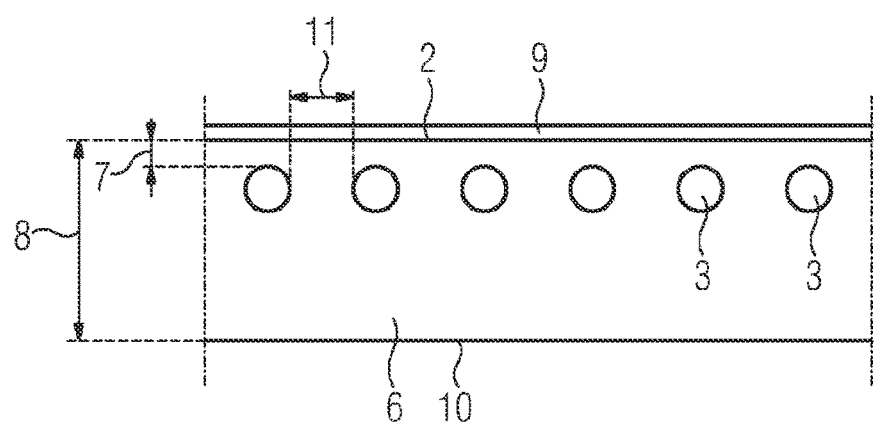
FIG. 2: A cut-out of a schematic cross section of the inventive turbine blade as shown in FIG. 1.

FIG. 2 shows a cutout of a schematic cross section of the outer wall 6 of the inventive turbine blade as shown in FIG. 1. For the reason of simplification, the surface is shown as straight line without curvature. The cutout is essentially perpendicular to the outer surface 2 and essentially perpendicular to the direction of the flow of the cooling fluid. The cooling channels 3 are arranged with essentially the same pitch 11 and distance 7 to the outer surface 2. Herein, said distance 7 of the cooling channels 3 to the outer surface 2 is small compared to the distance 8 of the outer surface 2 to the inner surface 10. Said outer surface 2 is coated with a thermal barrier coating 9 made of a ceramic material.

Figure 3A:
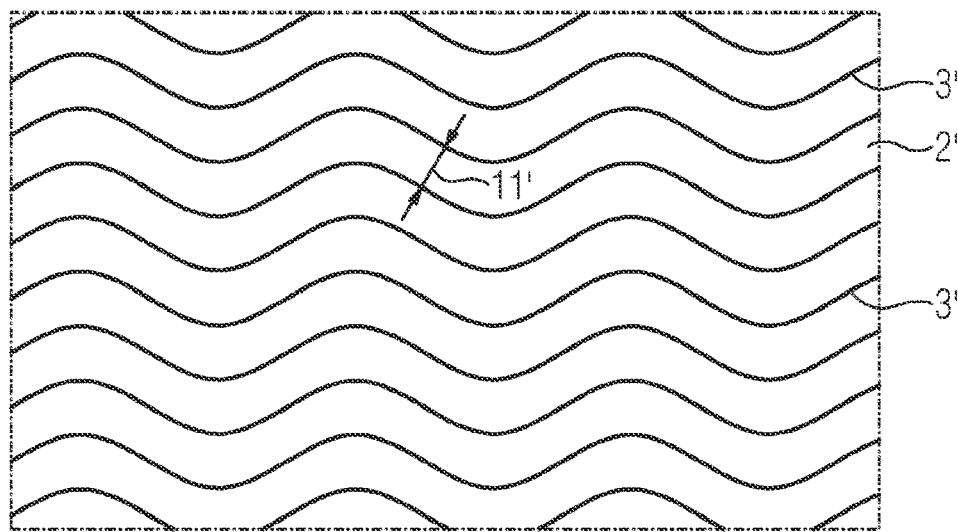
FIGS. 3a, 3b and 3c: Semi-transparent schematic sideviews of different inventive coolable components.
Figure 3B:
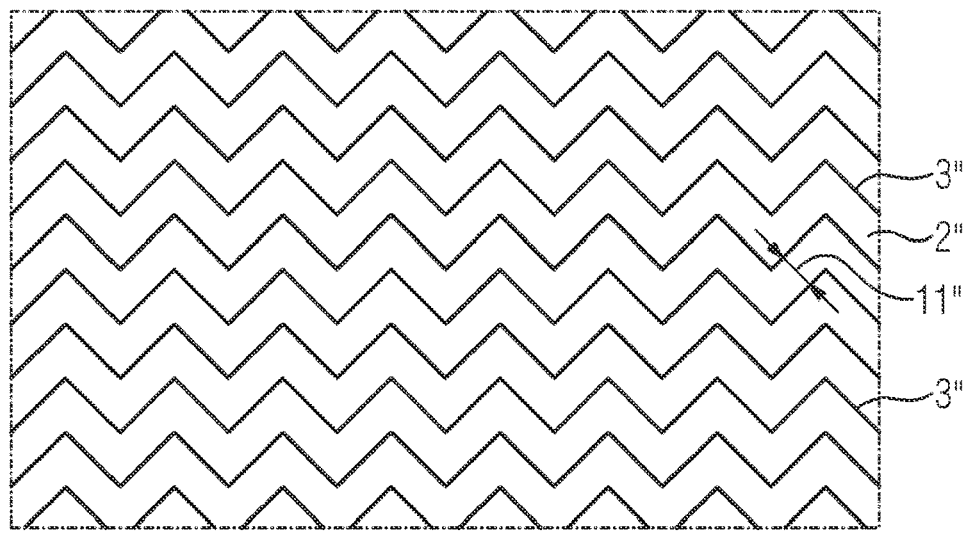
Figure 3C:
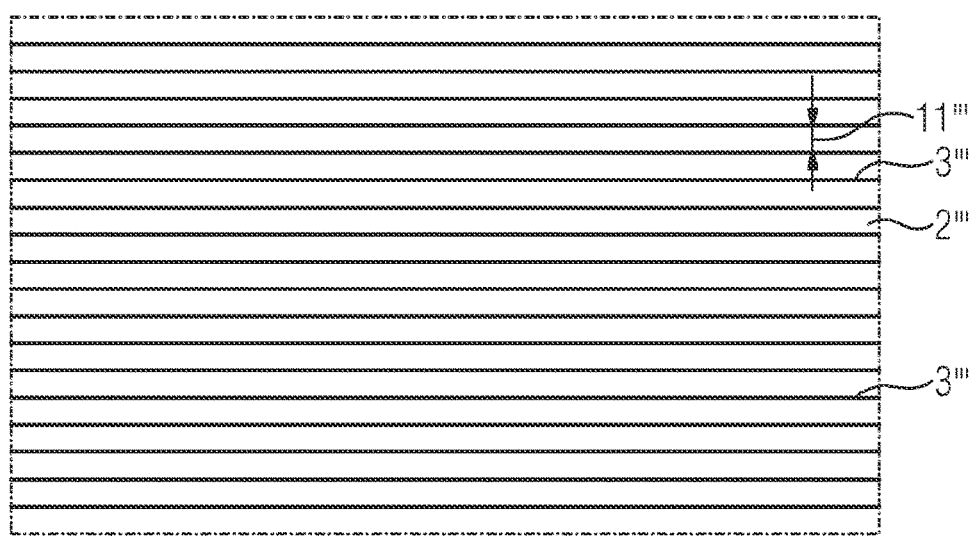

FIGS. 3a, 3b and 3c show semi-transparent schematic sideviews of different inventive coolable components. Herein, the coolable components provide different layouts of the at least one cooling channel 3', 3", 3'" below the outer surface 2', 2", 2'". It must be noted that, for example, the at least one cooling channel 3'" in FIG. 3c is shown in the form of essentially straight lines, although, a minor deviation naturally results from the curvature of the outer wall. Additionally, the channels shown are typically only essentially parallel, as a curved outer wall also results in small adaptions to be included into design resulting in small deviations from the real parallel arrangement.

In FIG. 3a the part of the at least one cooling channel 3' shown is arranged in the form of essentially parallel curved lines. The part of the at least one cooling channel shown provides the same pitch 11' between the cooling channels 3'. Such an arrangement typically provides a more intense heat exchange compared to mere straight lines.

In FIG. 3b the part of the at least one cooling channel 3" shown is arranged in form of essentially parallel straight lines providing sharp bends. Said cooling channels 3" provide essentially the same pitch 11" in the area shown. The sharp bends as shown in this inventive embodiment provide an angle between 80° and 100°. Surprisingly, such arrangement providing a less laminar flow provides a very efficient heat exchange. For example, such arrangement proved to be beneficial for areas of the coolable component being required to be cooled especially well.

In FIG. 3c the part of the at least one cooling channel 3'" shown is arranged in form of essentially straight lines. The straight lines are arranged with essentially the same pitch 11'" for the part of the at least one cooling channel 3'" shown. This provides well calculable cooling with a low chance of plugging the at least one cooling channel 3'" based on the homogeneous laminar flow of the cooling fluid through said part of the at least one cooling channel.

Figure 4:
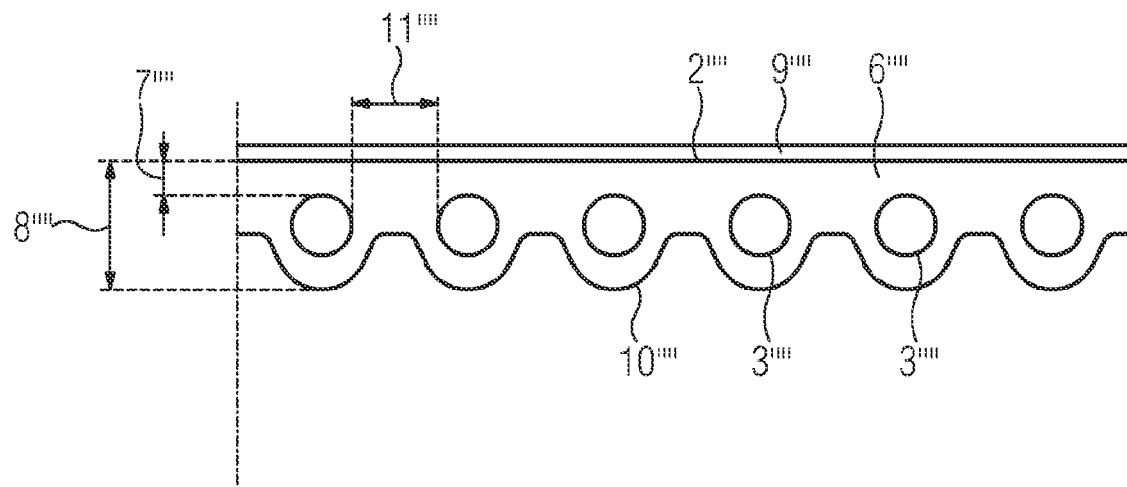
FIG. 4: A cutout of a schematic cross section of an alternative inventive coolable component.

FIG. 4 shows a cutout of a schematic cross section of an alternative inventive coolable component. Herein, said cutout is essentially perpendicular to the outer surface 2"" and essentially perpendicular to the direction of the flow of the cooling fluid through the at least one cooling channel 3"". Said outer surface 2"" provides a thermal barrier coating 9"" increasing the thermal stability of the coolable component.

Herein, an alternative layout of the outer wall 6"" containing the at least one cooling channel 3"" is shown. In more detail, the side-wall is relatively thin and provides thickened areas at the location of the at least one cooling channel 3"". Said thickened parts of the outer wall 6"" extend solely to the inside of the coolable component, while the outside of the component remains even. This results in a varying distance 8"" between the outer surface 2"" and the inner surface 10"". Simultaneously, the pitch 11"" is the same for the cooling channels 3"" shown in FIG. 4.

Such layout provides the possibility to realize the inventive coolable component will far less material reducing the overall weight of the coolable component. Such reduced weight is, for example, especially interesting for the moving parts of a device like a streaming engine. For example, providing rotor blades with such layout allows a great reduction of the weight of said rotor blades reducing the inertia and, thus, allow a faster change of the rotation speed of the rotor containing such rotor blades.

Figure 5:
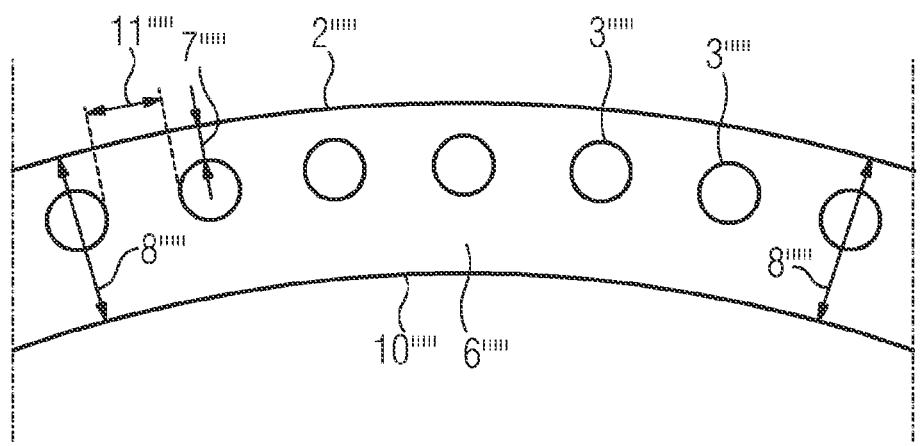
FIG. 5: A cutout of a schematic cross section of another alternative inventive coolable component.

FIG. 5 additionally shows the cutout of a schematic cross section of an alternative inventive coolable component. Herein, the outer surface 2""' of the outer wall 6""' provides no coating. Below the curved outer surface, the at least one cooling channel 3""' is placed with an essentially equal distance 7""' from the outer surface. The part of the at least one cooling channel 3""' as shown provides essentially the same pitch 11""'.

Comparable to FIG. 2 the distance 7""' between the outer surface 2""' and the at least one cooling channel 3""' is significantly smaller than the distance 8""' between the outer surface 2""' and the inner surface 10""' of the outer wall 6""'.

The invention claimed is:

1. A coolable component for a streaming engine, comprising:
   an outer wall providing an outer surface adapted to be in contact with a hot fluid like a hot gas stream used in the streaming engine or to be coated with a coating that is adapted to be in contact with the hot fluid, wherein the outer surface is at least partially curved,
   at least one cooling channel inside the outer wall adapted to guide a cooling fluid through said at least one cooling channel to cool the outer wall during operation of the streaming engine,
   wherein the at least one cooling channel is adapted to provide a convection cooling of the outer surface,
   wherein at least 13% of the outer surface is located above the at least one cooling channel and provides a distance between the outer surface and the at least one cooling channel of at least 7% of a total thickness of the outer wall measured along a straight line being perpendicular to the outer surface and being at least 0.2 mm, and
   wherein the at least one cooling channel provides a surface area in a cross section perpendicular to a direction of the at least one cooling channel of at least 20% of $t^2$, wherein t is an average thickness of the outer wall measured perpendicular to the outer surface, and
   wherein at least 60% of the outer surface provides a distance to the at least one cooling channel of at most 0.9 mm, and
   wherein in a select cooling channel of the at least one cooling channel, there is a changing form in the cross section perpendicular to the direction of a flow of the cooling fluid.

2. The coolable component according to claim 1, wherein the at least one cooling channel is free of a connection to a film cooling hole.

3. The coolable component according to claim 1, wherein the at least one cooling channel provides the surface area in the cross section perpendicular to the direction of the at least one cooling channel of at most 120% of $t^2$, wherein t is the average thickness of the outer wall measured perpendicular to the outer surface.

4. The coolable component according to claim 1, wherein the at least one cooling channel is adapted to provide a flow of the cooling fluid being essentially parallel to the outer surface.

5. The coolable component according to claim 1, wherein at most 5% of the outer surface located above the at least one cooling channel provides a distance between the outer surface and the at least one cooling channel of at most 3% of the total thickness of the outer wall measured along a straight line being perpendicular to the outer surface.

6. The coolable component according to claim 1,
wherein at least 13% of the outer surface is located above the at least one cooling channel and provides a distance between the outer surface and the at least one cooling channel of at most 3 mm and at most 35% of the total thickness of the outer wall measured along a straight line being perpendicular to the outer surface.

7. The coolable component according to claim 1,
wherein the coolable component is selected from turbine blades, guide vanes, rotor blades, or heat shields for the streaming engine.

8. A streaming engine comprising:
a coolable component according to claim 1.

9. A method of manufacturing a coolable component according to claim 1, comprising:
providing the outer wall including the at least one cooling channel inside the outer wall.

10. The method according to claim 9,
wherein the step of providing the outer wall is performed using additive manufacturing.

11. The method according to claim 9,
wherein the outer wall containing the at least one cooling channel is manufactured upon an existing base being produced separately using conventional means of manufacturing.

12. A method for replacement of a different or a used coolable component in the streaming engine, comprising:
replacing the different or the used coolable component with a coolable component according to claim 1.

13. The coolable component according to claim 2,
wherein the at least one cooling channel is not connected to a cooling hole.

14. A coolable component for a streaming engine, comprising:
an outer wall providing an outer surface adapted to be in contact with a hot fluid like a hot gas stream used in the streaming engine or to be coated with a coating that is adapted to be in contact with the hot fluid, wherein the outer surface is at least partially curved,
at least one cooling channel inside the outer wall adapted to guide a cooling fluid through said at least one cooling channel to cool the outer wall during operation of the streaming engine,
wherein the at least one cooling channel is adapted to provide a convection cooling of the outer surface,
wherein at least 13% of the outer surface is located above the at least one cooling channel and provides a distance between the outer surface and the at least one cooling channel of at least 7% of a total thickness of the outer wall measured along a straight line being perpendicular to the outer surface and being at least 0.2 mm, and
wherein at least 60% of the outer surface provides a distance to the at least one cooling channel of at most 3 mm, and
wherein the at least one cooling channel provides a surface area in a cross section perpendicular to a direction of the at least one cooling channel of at least 20% of t2, wherein t is an average thickness of the outer wall measured perpendicular to the outer surface, and
wherein in a select cooling channel of the at least one cooling channel, there is a changing form in the cross section perpendicular to the direction of a flow of the cooling fluid.

15. A coolable component for a streaming engine, comprising:
an outer wall providing an outer surface adapted to be in contact with a hot fluid like a hot gas stream used in the streaming engine or to be coated with a coating that is adapted to be in contact with the hot fluid, wherein the outer surface is at least partially curved,
at least one cooling channel inside the outer wall adapted to guide a cooling fluid through said at least one cooling channel to cool the outer wall during operation of the streaming engine,
wherein the at least one cooling channel is adapted to provide a convection cooling of the outer surface,
wherein at least 13% of the outer surface is located above the at least one cooling channel and provides a distance between the outer surface and the at least one cooling channel of at least 7% of a total thickness of the outer wall measured along a straight line being perpendicular to the outer surface and being at least 0.2 mm, and
wherein at least 60% of the outer surface provides a distance to the at least one cooling channel of at most 3 mm, and wherein at least 60% of the outer surface provides a distance to the at least one cooling channel of at most 0.9 mm, and
wherein in a select cooling channel of the at least one cooling channel, there is a changing form in the cross section perpendicular to the direction of a flow of the cooling fluid.

16. The coolable component according to claim 1, wherein the at least one cooling channel comprises a changing pitch.

17. The coolable component according to claim 1, wherein the at least one cooling channel comprises different lengths.

* * * * *

UNITED STATES PATENT AND TRADEMARK OFFICE
CERTIFICATE OF CORRECTION

PATENT NO. : 11,713,684 B2
APPLICATION NO. : 17/416493
DATED : August 1, 2023
INVENTOR(S) : Mats Annerfeldt, Mats Kinell and Rickard Magnéli It is certified that error appears in the above-identified patent and that said Letters Patent is hereby corrected as shown below:

In the Claims

Claim 1, Line 43, remove [t2], and insert -- $t^2$ --;

Claim 14, Line 11, remove [t2], and insert -- $t^2$ --;

Claim 15, Lines 36 – 38, remove [wherein at least 60% of the outer surface provides a distance to the at least one cooling channel of at most 3 mm, and].

Signed and Sealed this
Fifth Day of September, 2023

Katherine Kelly Vidal
*Director of the United States Patent and Trademark Office*